(12) United States Patent
Goy et al.

(10) Patent No.: US 12,473,865 B1
(45) Date of Patent: Nov. 18, 2025

(54) START PUMP AND GENERATOR

(71) Applicant: Hamilton Sundstrand Corporation, Charlotte, NC (US)

(72) Inventors: Edward Goy, Crystal Lake, IL (US); Myles Kelly, Willimantic, CT (US)

(73) Assignee: Hamilton Sundstrand Corporation, Charlotte, NC (US)

( * ) Notice: Subject to any disclaimer, the term of this patent is extended or adjusted under 35 U.S.C. 154(b) by 0 days.

(21) Appl. No.: 18/781,322

(22) Filed: Jul. 23, 2024

(51) Int. Cl.
*F02C 9/00* (2006.01)
*F02C 9/26* (2006.01)
*F02C 9/38* (2006.01)

(52) U.S. Cl.
CPC .............. *F02C 9/263* (2013.01); *F02C 9/38* (2013.01)

(58) Field of Classification Search
CPC .. F02C 9/263; F02C 7/275; F02C 9/36; F02C 7/236
See application file for complete search history.

(56) References Cited

U.S. PATENT DOCUMENTS

| 8,286,432 | B2 | 10/2012 | Anson | |
|---|---|---|---|---|
| 2001/0054290 | A1* | 12/2001 | Herbison | F02C 9/30 60/734 |
| 2010/0031658 | A1* | 2/2010 | Falke | F02C 9/36 60/734 |
| 2021/0293182 | A1 | 9/2021 | Nako et al. | |

* cited by examiner

Primary Examiner — Katheryn A Malatek
(74) Attorney, Agent, or Firm — Kinney & Lange, P.A.

(57) ABSTRACT

A fuel system for an aircraft includes a main fuel pump, a metering valve fluidly connected to the main fuel pump, a selector valve fluidly connected to the metering valve, a check valve fluidly connected to the metering valve, and an electric motor driven start pump fluidly connected to the check valve and the selector valve. During a start-up condition, the fuel system is configured to permit a fuel to flow through the electric motor driven start pump and through the selector valve to an engine. During a cruise condition, the fuel system is configured to permit the fuel to flow from a high-pressure fuel source and through the electric motor driven start pump start pump to drive the electric motor driven start pump to generate electrical energy.

20 Claims, 6 Drawing Sheets

START PUMP AND GENERATOR

BACKGROUND

The present disclosure relates to an aircraft fuel system, and in particular, to a start pump for an aircraft fuel system.

An aircraft fuel system utilizes a main fuel pump during start-up and cruise conditions. The main fuel pump provides the burn flow necessary for actuation of the engine. Once the engine has started, it requires less burn flow to operate at cruise conditions. Because the main fuel pump is sized to accomplish engine start-up, the main fuel pump is larger than necessary during cruise conditions. As such, after start-up, the main fuel pump adds unnecessary weight to the aircraft. It would be beneficial to avoid unnecessary added weight to the aircraft during cruise conditions.

SUMMARY

In some examples, a fuel system for an aircraft may include a main fuel pump, a metering valve fluidly connected to the main fuel pump, a selector valve fluidly connected to the metering valve, a check valve fluidly connected to the metering valve, and an electric motor driven start pump fluidly connected to the check valve and the selector valve. During a start-up condition, the fuel system is configured to permit a fuel to flow through the electric motor driven start pump and through the selector valve to an engine. During a cruise condition, the fuel system is configured to permit the fuel to flow from a high-pressure fuel source and through the electric motor driven start pump to drive the electric motor driven start pump to generate electrical energy.

In some examples, a fuel system for an aircraft may include a main fuel pump configured to provide fuel to an engine of the aircraft and a start pump configured to provide fuel to an engine of the aircraft. The start pump is an electric motor driven start pump that is connected to a generator. The fuel system further includes a metering valve fluidly connected to the main fuel pump, a selector valve fluidly connected to the metering valve and the start pump and configured to receive fuel pumped from the main fuel pump and fuel pumped from the start pump, and a check valve between the metering valve and the start pump. The check valve is configured to permit a bypass flow to flow from the metering valve to the start pump. The start pump is configured to operate in a forward direction to deliver fuel to the engine of the aircraft during engine start-up and is configured to operate in a reverse direction after engine start-up to generate electrical power.

DETAILED DESCRIPTION

In general, the present disclosure describes an electric motor driven start pump that is incorporated into an aircraft fuel system to act as a start pump to provide additional power to the main fuel pump such that the main fuel pump can be smaller and require less power to operate at cruise conditions. After engine start-up, the start pump is driven, or operates, in a reverse direction to act as a hydraulic generator, generating electrical power, and delivers bypass flow from the main fuel pump or an actuation pump back to the main fuel pump and/or to the fuel tank for continued use. Thus, electric motor driven start pump is utilized after start-up to decrease the amount of fuel used by the fuel system and increase the amount of available electrical power.

Figure 1A:
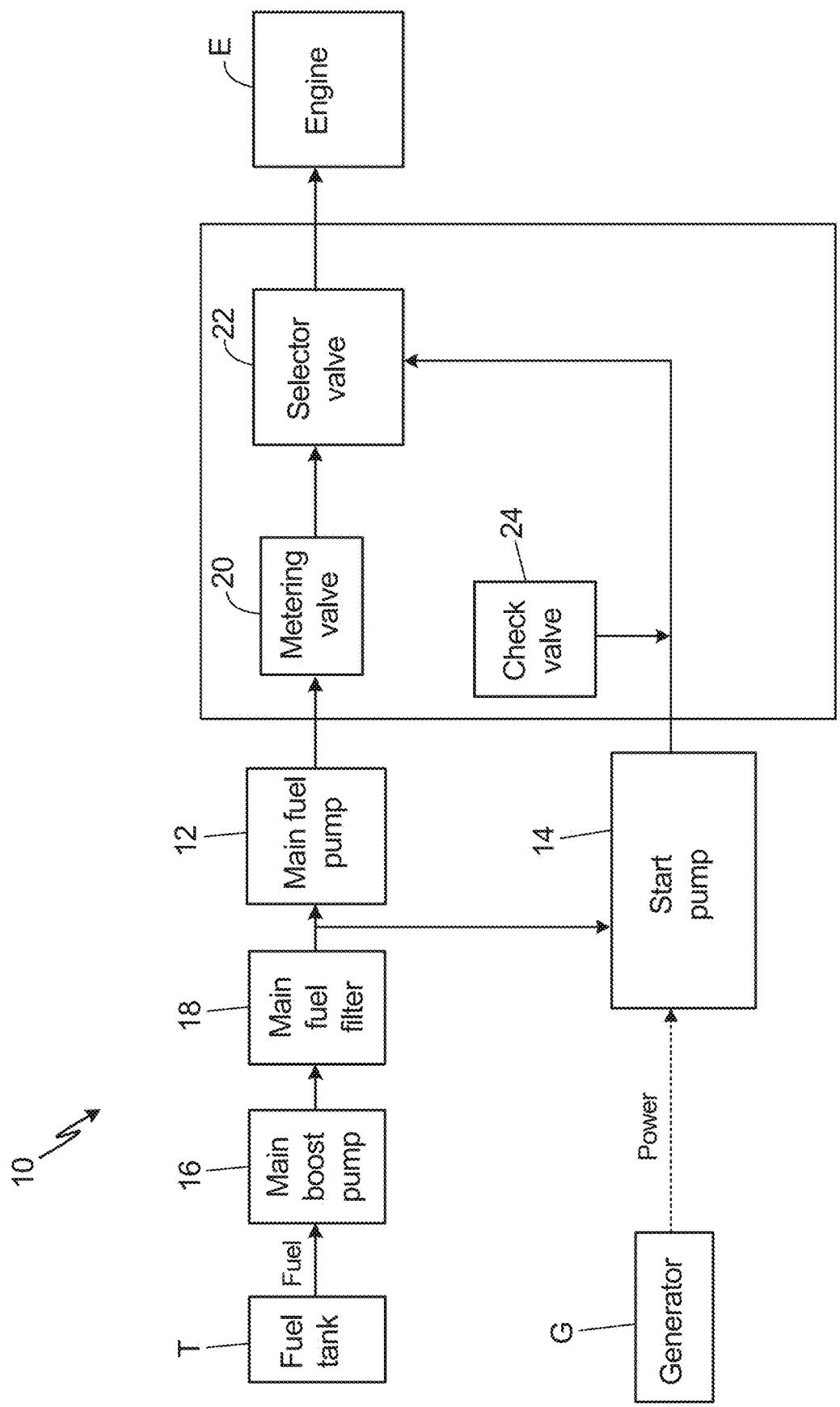
FIG. 1A is a schematic view of a fuel system including a start pump during start-up conditions.
Figure 1B:
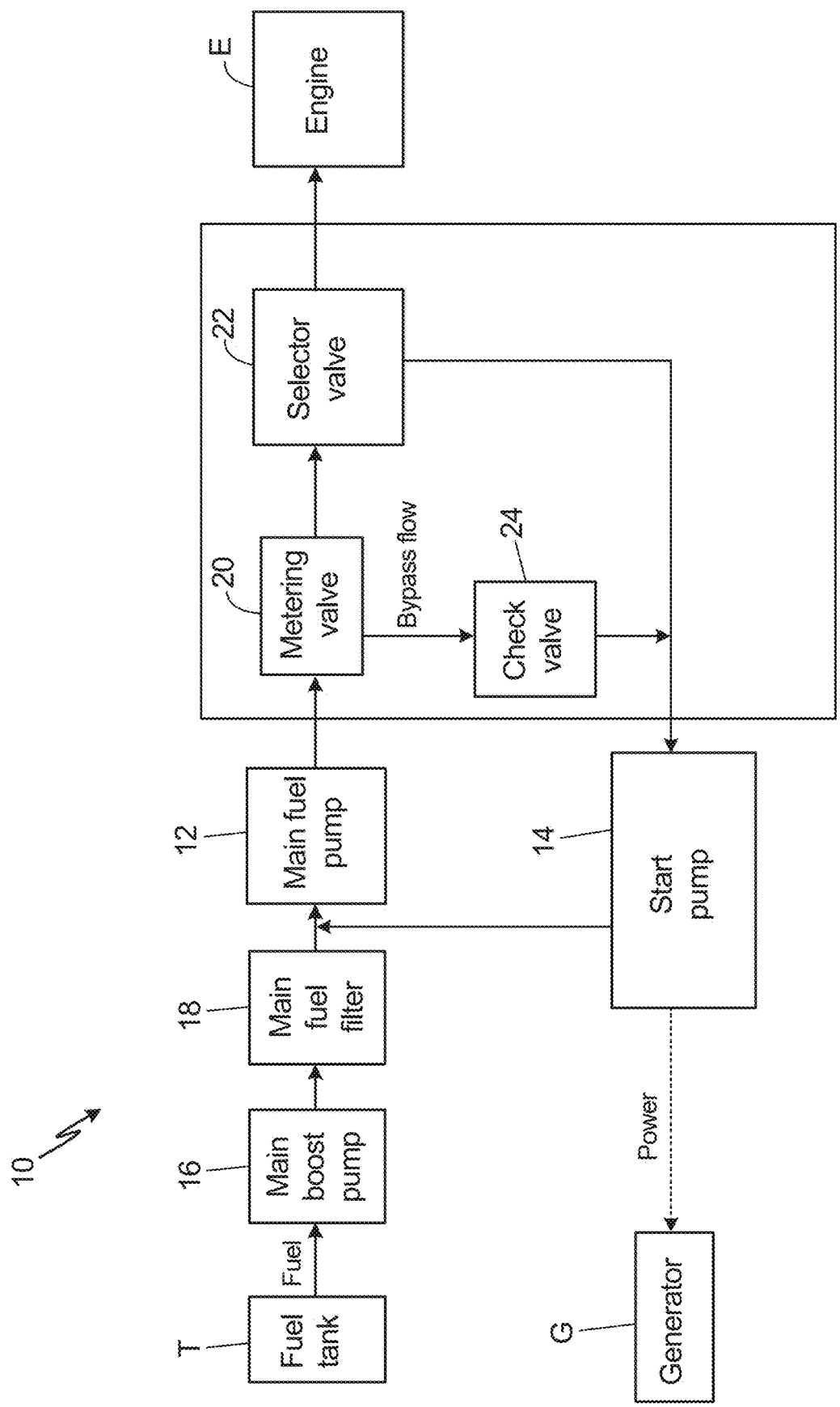
FIG. 1B is a schematic view of the fuel system including the start pump during cruise conditions.

FIG. 1A is a schematic view of fuel system 10 including start pump 14 during start-up conditions. FIG. 1B is a schematic view of fuel system 10 including start pump 14 during cruise conditions. FIGS. 1A and 1B will be discussed together. Fuel system 10 includes main fuel pump 12, start pump 14, main boost pump 16, main fuel filter 18, metering valve 20, selector valve 22, and check valve 24. Also shown in FIGS. 1A and 1B are fuel tank T, generator G, and engine E.

Fuel system 10 is an aircraft fuel system. Fuel system 10 has main fuel pump 12 and start pump 14 fluidly connected to engine E of the aircraft. Main fuel pump 12 is an EGB mounted positive displacement pump. Main fuel pump 12 has an input port at an upstream end and a discharge port at a downstream end. Start pump 14 is an electric motor driven pump mounted on a gear box. Start pump 14 may be a piston pump, a vane pump, another suitable positive displacement pump, a centrifugal pump, or any other suitable pump. Start pump 14 is a smaller, lighter pump than main fuel pump 12. Start pump 14 is also a hydraulic generator. Start pump 14 is electrically connected to generator G of the aircraft. Start pump 14 has an input port at an upstream end and a discharge port at a downstream end. Start pump 14 operates in a forward direction during start-up conditions and in a reverse, or backward, direction during cruise conditions.

Fuel tank T is fluidly connected to main boost pump 16, which is fluidly connected to main fuel filter 18 such that main boost pump 16 is between fuel tank T and main fuel filter 18. Main fuel filter 18 is fluidly connected to main fuel pump 12 such that main fuel filter 18 is between main boost pump 18 and main fuel pump 12. Main fuel filter 18 is fluidly connected to start pump 14 such that main fuel filter 18 is between main boost pump 16 and start pump 14. Main fuel pump 12 is fluidly connected to start pump 14 and metering valve 20. As such, main fuel pump 12 is between main fuel filter 18 and metering valve 20. Metering valve 20 is fluidly connected to selector valve 22, which is fluidly connected to engine E. As such, metering valve 20 is between main fuel pump 12 and selector valve 22. Selector valve 22 is between metering valve 20 and engine E. Selector valve 22 is also fluidly connected to start pump 14 such that selector valve 22 is between start pump 14 and engine E. Selector valve 22 may be one or more selector valves. Selector valve 22 is a sharing valve. Check valve 24 is fluidly connected to metering valve 20 and start pump 14 such that check valve 24 is between metering valve 20 and start pump 14. Additionally, check valve 24 is fluidly connected to selector valve 22 such that check valve 24 is also between selector valve 22 and metering valve 20. Start pump 114, in addition to or instead of main fuel pump 12, may be fluidly connected to any other suitable high pressure fuel source, such as an actuation pump.

Fuel system 10 powers engine E of the aircraft. As shown in FIG. 1A, during start-up conditions, main fuel pump 12 and start pump 14 pump the fuel from fuel tank T to engine E, providing the actuation flow needed to start engine E. Fuel tank T stores the fuel, which moves from fuel tank T through main boost pump 16 to travel through main fuel filter 18 and reach main fuel pump 12. Main fuel pump 12 pumps the fuel to metering valve 20, which determines whether the fuel is to be directed to engine E for fuel burn. At start-up, metering valve 20 directs the fuel to selector valve 22, which is in an open position with respect to metering valve 20, to provide the fuel to engine E. As such, check valve 24 is a one-way valve that is in the closed position. Fuel does not travel from metering valve 20 to check valve 24 during start-up conditions.

During start-up conditions, start pump 14 is electrically powered by generator G. The motor of start pump 14 is driven via electrical power to activate the pump of start pump 14. Fuel from fuel tank T moves through main boost pump 16 and main fuel filter 18 to start pump 14 during start-up conditions. Start pump 14 pumps the fuel in the forward direction to selector valve 22, which is in an open position with respect to start pump 14 when start pump 14 is operating in the forward direction, or during engine start-up. Check valve 24 is in the closed position when start pump 14 operates in the forward direction, or during start-up conditions, preventing the fuel from flowing from start pump 14 through check valve 24. As such, fuel flows through start pump 14 and through selector valve 22 to provide the fuel to engine E.

During start-up conditions, all fuel is used for fuel burn to start engine E. Selector valve 22 receives and combines the fuel pumped from main fuel pump 12 and the fuel pumped from start pump 14. The combined fuel from main fuel pump 12 start pump 14 moves from selector valve 22 to engine E, becoming the burn flow needed for the start-up of engine E.

After engine E is started, fuel system 10 operates at cruise conditions, as shown in FIG. 1B. Engine E requires less fuel to maintain cruise conditions. Main fuel pump 12 alone provides the burn flow to engine E, functioning as main fuel pump 12 functioned during start-up conditions. During cruise conditions, power is no longer provided to start pump 14, which no longer pumps fuel for fuel burn. Start pump 14 operates independently of the speed of engine E.

During cruise conditions, some fuel from fuel tank T is pumped by main fuel pump 12 but not used for fuel burn, becoming bypass flow. Alternatively, or additionally, some fuel from fuel tank T may come from an actuation pump or any other suitable high pressure fuel source to become bypass flow. Metering valve 20 directs the bypass flow from main fuel pump 12 to check valve 24. The bypass flow moves check valve 24 into the open position. The bypass flow moves through check valve 24 to a discharge port of start pump 14, driving the motor of start pump 14 in the reverse, or backward, direction. As such, check valve 24 is in the open position when start pump 14 operates in the reverse direction, permitting the bypass flow to flow from metering valve 20, through check valve 24, to start pump 14. Selector valve 22 is in a closed position with respect to start pump 14 when start pump is operating in the reverse direction, preventing the bypass flow from flowing through check valve 24 into selector valve 22.

Start pump 14 is driven by the bypass flow in the reverse direction, delivering the bypass flow through start pump 14 and back to main fuel pump 12 and operating generator G to generate electrical power. As bypass flow flows from a high-pressure fuel source and drives start pump 14 in a reverse direction, the bypass flow exits the input port of start pump 14 and moves to main fuel pump 12. Additionally, when the bypass flow moves through start pump 14 to drive start pump 14 to operate in a reverse direction, the bypass flow spins the motor of start pump 14 in the reverse direction and operates generator G to generate electrical energy. As such, the bypass flow flows through start pump 14 to drive start pump 14 to generate electrical energy, start pump 14 converting hydraulic power to electrical power. As a result, start pump 14 acts as a hydraulic generator during cruise conditions. The generated electrical power is subsequently stored in generator G for later use.

Traditionally, main fuel pumps are sized to accommodate start conditions, which require more fuel than cruise conditions. As such, the main fuel pump is oversized for cruise conditions. The main fuel pump becomes unnecessary weight that increases fuel burn during cruise conditions, wasting heat and power. A start pump can be added to supplement the main fuel pump during start-up, allowing the main fuel pump to be smaller. However, after start-up is achieved, the start pump is powered off and is non-functional, becoming unnecessary added weight as no additional flow is needed. The added weight of the start pump wastes fuel during cruise conditions.

Start pump 14 supplements the flow of main fuel pump 12 to reduce the size of main fuel pump 12. Because start pump 14 provides fuel to engine E during start-up conditions, main fuel pump 12 is sized for higher speed conditions, requiring less power to operate at cruise conditions. As a result, main fuel pump 12 requires less fuel burn such that less heat is produced by main fuel pump 12 and less fuel needs to be pumped into fuel system 10. Further, because fuel system 10 utilizes start pump 14 after the start-up of engine E, start pump 14 is functional during cruise conditions.

Start pump 14 acts as both a (1) start-up pump and (2) hydraulic generator. Because start pump 14 recirculates bypass flow back to main fuel pump 12 during cruise conditions, less fuel is needed in fuel system 10. Additional electrical power is generated when start flow is not needed so that more electrical power is available on the aircraft for utilization by the aircraft system. Thus, the overall horsepower, size, fuel requirements, and thermal effects of fuel system 10 is reduced, and available electrical power is increased.

Figure 2A:
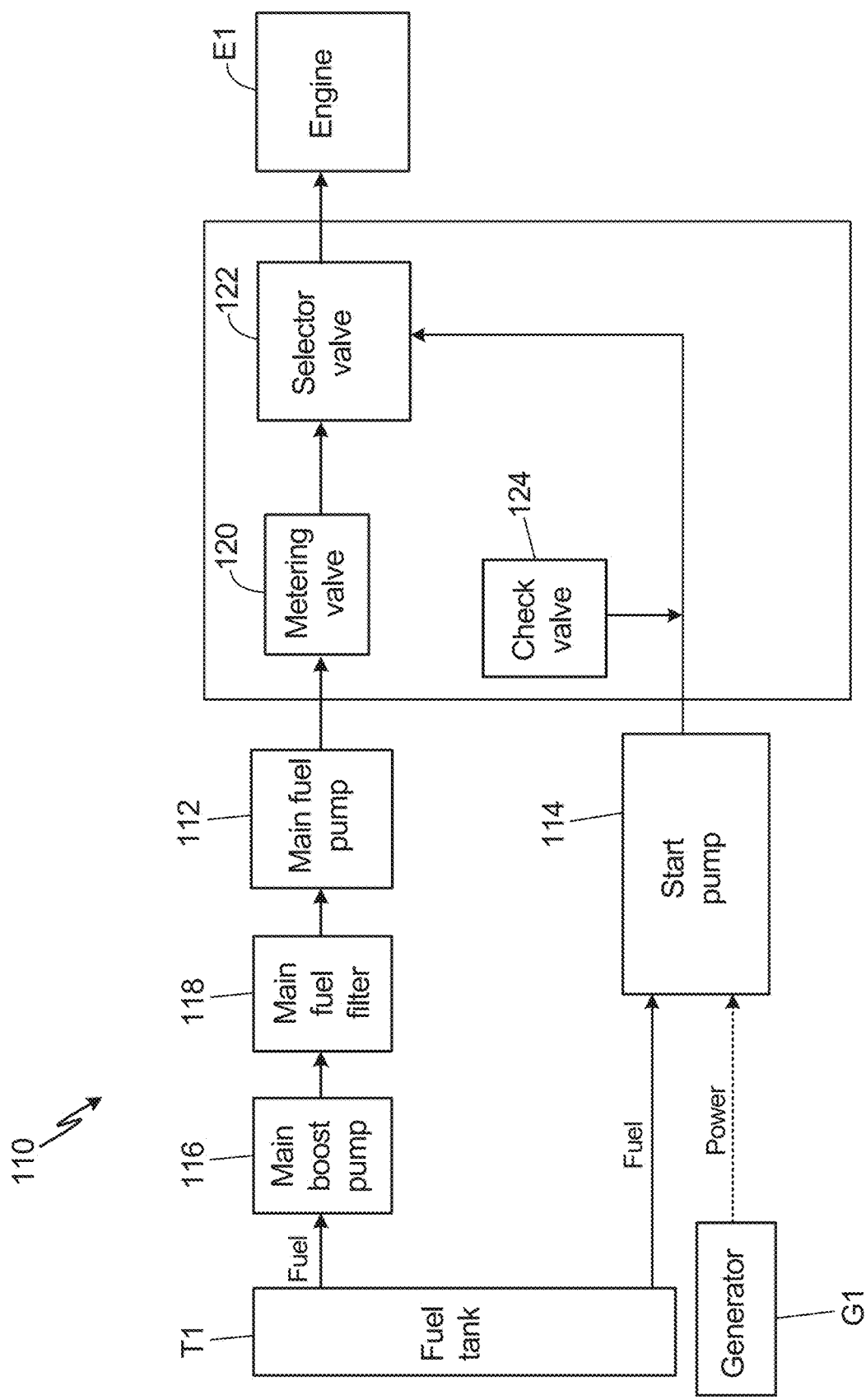
FIG. 2A is a schematic view of a second embodiment of a fuel system including a start pump during start-up conditions.
Figure 2B:
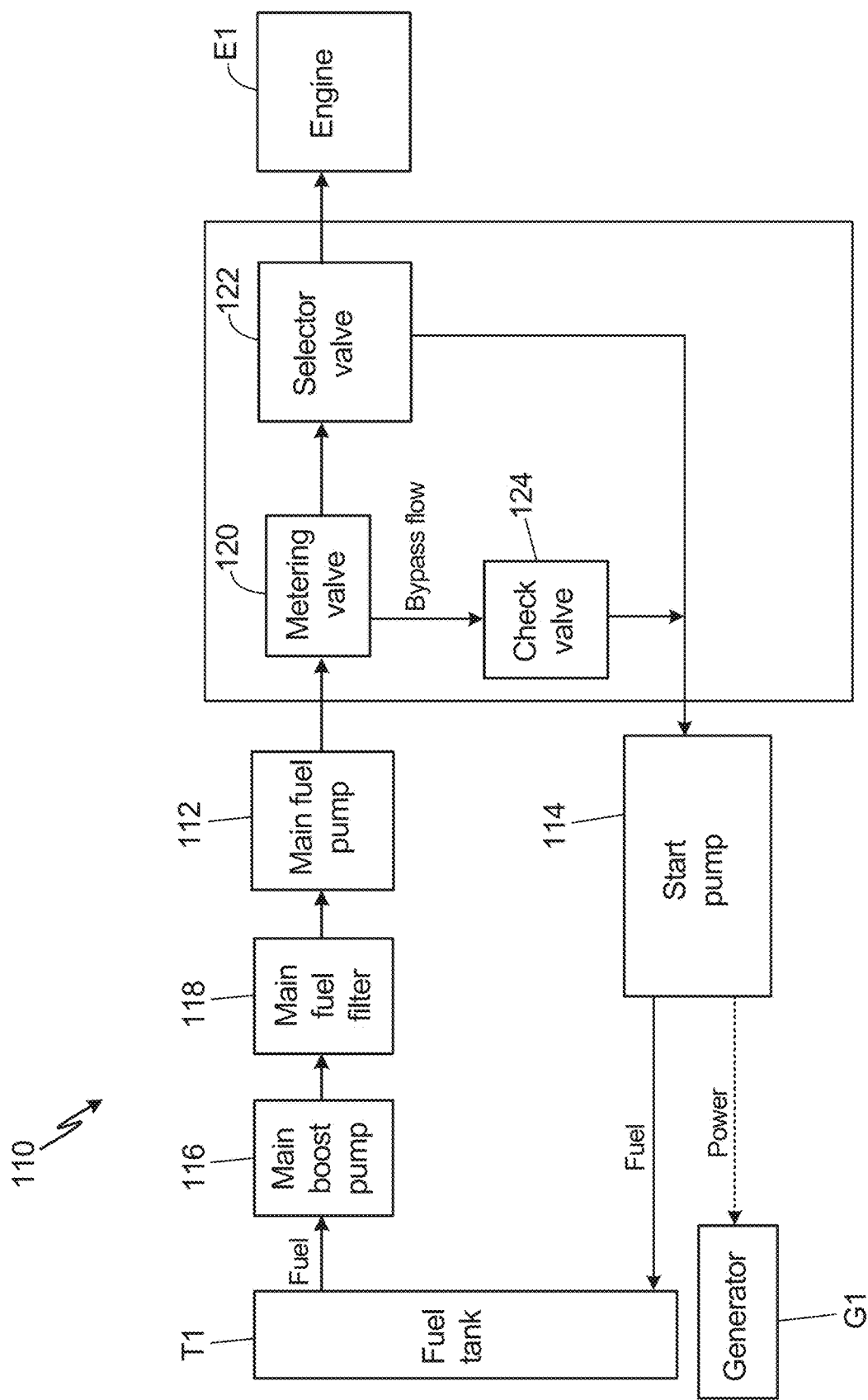
FIG. 2B is a schematic view of the second embodiment of the fuel system including the start pump during cruise conditions.

FIG. 2A is a schematic view of fuel system 110 including start pump 114 during start-up conditions. FIG. 2B is a schematic view of fuel system 110 including start pump 114 during cruise conditions. FIGS. 2A and 2B will be discussed together. Fuel system 110 includes main fuel pump 112, start pump 114, main boost pump 116, main fuel filter 118, metering valve 120, selector valve 122, and check valve 124. Also shown in FIGS. 2A and 2B are fuel tank T1, generator G1, and engine E1.

Fuel system 110 has the same structure and function as fuel system 10 described with respect to FIG. 1. However, fuel system 110 has start pump 114 fluidly connected to fuel tank T1 rather than main fuel pump 112. During start-up conditions, fuel from fuel tank T moves directly to start pump 114, rather than through main boost pump 116 and main fuel filter 118 to reach start pump 114. During cruise conditions, start pump 114 delivers the bypass flow to fuel tank T1 rather than main fuel pump 112. As a result, heat is minimized upstream of main fuel pump 112 compared to fuel system 110. As such, a larger thermal source can be utilized by fuel system 110. The bypass flow enters fuel tank T1 and is recirculated through fuel system 110 as fuel.

Figure 3A:
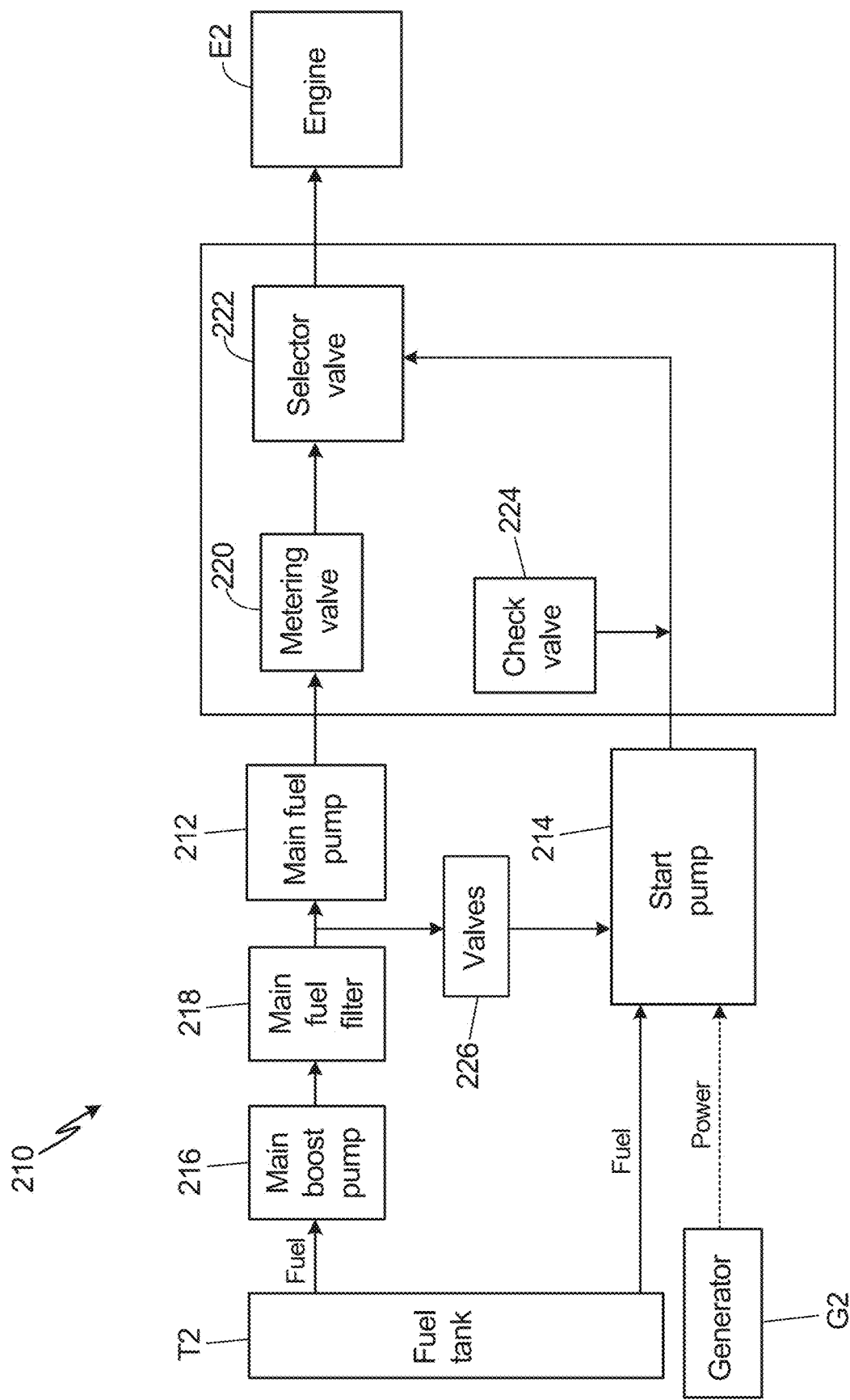
FIG. 3A is a schematic view of a third embodiment of a fuel system including a start pump during start-up conditions.
Figure 3B:
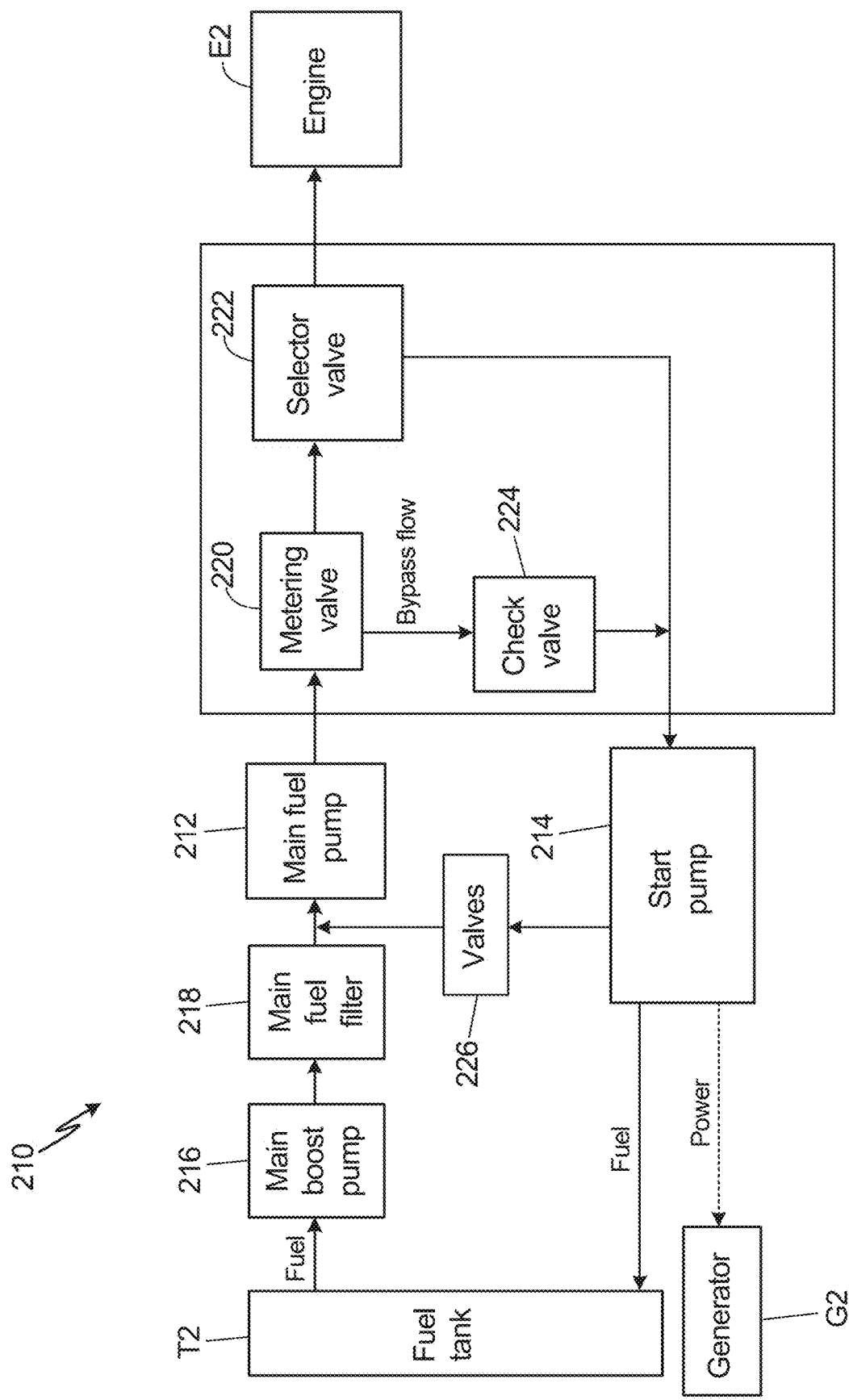
FIG. 3B is a schematic view of the third embodiment of the fuel system including the start pump during cruise conditions.

FIG. 3A is a schematic view of fuel system 210 including start pump 214 during start-up conditions. FIG. 3B is a schematic view of fuel system 210 including start pump 214 during cruise conditions. FIGS. 3A and 3B will be discussed together. Fuel system 210 includes main fuel pump 212, start pump 214, main boost pump 216, main fuel filter 218, metering valve 220, selector valve 222, check valve 224, and valves 226. Also shown in FIGS. 3A and 3B are fuel tank T2, generator G2, and engine E2.

Fuel system 210 has the same structure and function as fuel system 10 described with respect to FIG. 1. However, fuel system 210 additionally has start pump 214 fluidly connected to fuel tank T2 and includes valves 226. Valves 226 are selector valves fluidly connected to and between main fuel pump 212 and start pump 214. During start-up conditions, start pump 214 receives fuel directly from fuel tank T when valves 226 are in a closed position or through boost pump 216 and main fuel filter 218 when valves 226 are in an open position. During cruise conditions, start pump 114 may deliver the bypass flow back to fuel tank T2 or to main fuel pump 212, depending on the needs of the aircraft, such as efficiency of engine E2 or the amount of heat at main fuel pump 212. For example, if too much heat is at main fuel pump 12 or the fuel is very hot, start pump 214 can deliver the bypass flow to fuel tank T for recirculation to prevent fuel lacquering. As another example, if low heat is at main fuel pump 12, start pump 214 can deliver the bypass flow, which is hotter fuel, to an input port of main fuel pump 12 for recirculation, providing additional heat for higher efficiency. Valves 226 are closed when start pump 214 delivers the bypass flow to fuel tank T and are open when start pump 214 delivers the bypass flow to main fuel pump 12. Fuel system 210 can determine the better position to recirculate bypass flow based on the needs of fuel system 210.

DISCUSSION OF POSSIBLE EMBODIMENTS

The following are non-exclusive descriptions of possible embodiments of the present invention.

A fuel system for an aircraft includes a main fuel pump; a metering valve fluidly connected to the main fuel pump; a selector valve fluidly connected to the metering valve; a check valve fluidly connected to the metering valve; and an electric motor driven start pump fluidly connected to the check valve and the selector valve; wherein during a start-up condition, the fuel system is configured to permit a fuel to flow through the electric motor driven start pump and through the selector valve to an engine; and wherein during a cruise condition, the fuel system is configured to permit the fuel to flow from a high-pressure fuel source and through the electric motor driven start pump to drive the electric motor driven start pump to generate electrical energy.

The fuel system of the preceding paragraph can optionally include, additionally and/or alternatively, any one or more of the following features, configurations and/or additional components:

The electric motor driven start pump is configured to pump in a forward direction during the start-up condition, and the electric motor driven start pump is configured to be driven in the reverse direction by the fuel from the check valve during the cruise condition.

The electric motor driven start pump is a start pump and a hydraulic generator.

The electric motor driven start pump is configured to pump fuel to the selector valve for providing the fuel to an engine of the aircraft during the start-up condition.

The electric motor driven start pump is configured to be driven by a bypass flow to direct the fuel in a reverse direction to generate the electrical energy.

The electric motor driven start pump is fluidly connected to the main fuel pump and is configured to direct the fuel in a reverse direction to deliver the bypass flow to the main fuel pump.

The electric motor driven start pump is fluidly connected to a fuel tank and is configured to direct the fuel in a reverse direction to deliver the bypass flow to the fuel tank.

The electric motor driven start pump is configured to be driven in a reverse direction by the bypass flow to operate a generator to generate the electrical energy and deliver the bypass flow to the main fuel pump and/or to a fuel tank.

The main fuel pump is a positive displacement pump.

The electric motor driven start pump is fluidly connected to the main fuel pump.

The selector valve comprises a plurality of selector valves.

The selector valve is fluidly connected to the engine of the aircraft.

A fuel system for an aircraft includes a main fuel pump configured to provide fuel to an engine of the aircraft; a start pump configured to provide fuel to an engine of the aircraft, the start pump being an electric motor driven start pump that is connected to a generator; a metering valve fluidly connected to the main fuel pump; a selector valve fluidly connected to the metering valve and the start pump and configured to receive fuel pumped from the main fuel pump and fuel pumped from the start pump; and a check valve between the metering valve and the start pump, wherein the check valve is configured to permit a bypass flow to flow from the metering valve to the start pump; wherein the start pump is configured to operate in a forward direction to deliver fuel to the engine of the aircraft during engine start-up and is configured to operate in a reverse direction after engine start-up to generate electrical power.

The fuel system of the preceding paragraph can optionally include, additionally and/or alternatively, any one or more of the following features, configurations and/or additional components:

The check valve is configured to be in a closed position when the start pump operates in a forward direction and is configured to be in an open position when the start pump operates in a reverse direction.

The start pump is configured to be driven in a reverse direction by the bypass flow after engine start-up to operate a generator to generate the electrical power and to deliver the bypass flow to the main fuel pump or to a fuel tank.

The selector valve is configured to be in an open position when the start pump operates in a forward direction and is configured to be in a closed position with respect to the start pump when the start pump operates in the reverse direction.

The main fuel pump is a positive displacement pump.

A main boost pump fluidly connected to the fuel tank; and a main fuel filter fluidly connected to the main boost pump and the main fuel pump.

The start pump is fluidly connected to the main fuel pump.

The start pump is fluidly connected to the fuel tank.

While the invention has been described with reference to an exemplary embodiment(s), it will be understood by those skilled in the art that various changes may be made and equivalents may be substituted for elements thereof without departing from the scope of the invention. In addition, many modifications may be made to adapt a particular situation or material to the teachings of the invention without departing from the essential scope thereof. Therefore, it is intended that the invention not be limited to the particular embodiment(s) disclosed, but that the invention will include all embodiments falling within the scope of the appended claims.

The invention claimed is:

1. A fuel system for an aircraft, the fuel system comprising:
   a main fuel pump;
   a metering valve fluidly connected to the main fuel pump;
   a selector valve fluidly connected to the metering valve;
   a check valve fluidly connected to the metering valve; and
   an electric motor driven start pump fluidly connected to the check valve and the selector valve;
   wherein during a start-up condition, the fuel system is configured to permit a fuel to flow through the electric motor driven start pump and through the selector valve to an engine; and
   wherein during a cruise condition, the fuel system is configured to permit the fuel to flow from a fuel source and through the electric motor driven start pump to drive the electric motor driven start pump to generate electrical energy.

2. The fuel system of claim 1, wherein the electric motor driven start pump is configured to pump in a forward direction during the start-up condition, and the electric motor driven start pump is configured to be driven in a reverse direction by the fuel from the check valve during the cruise condition.

3. The fuel system of claim 1, wherein the electric motor driven start pump is a start pump and a hydraulic generator.

4. The fuel system of claim 1, wherein the electric motor driven start pump is configured to pump the fuel to the selector valve for providing the fuel to the engine of the aircraft during the start-up condition.

5. The fuel system of claim 4, wherein the electric motor driven start pump is configured to be driven by a bypass flow to direct the fuel in a reverse direction to generate the electrical energy.

6. The fuel system of claim 5, wherein the electric motor driven start pump is fluidly connected to the main fuel pump and is configured to direct the fuel in the reverse direction to deliver the bypass flow to the main fuel pump.

7. The fuel system of claim 5, wherein the electric motor driven start pump is fluidly connected to a fuel tank and is configured to direct the fuel in the reverse direction to deliver the bypass flow to the fuel tank.

8. The fuel system of claim 5, wherein the electric motor driven start pump is configured to be driven in the reverse direction by the bypass flow to operate a generator to generate the electrical energy and deliver the bypass flow to the main fuel pump and/or to a fuel tank.

9. The fuel system of claim 1, wherein the main fuel pump is a positive displacement pump.

10. The fuel system of claim 1, wherein the electric motor driven start pump is fluidly connected to the main fuel pump.

11. The fuel system of claim 1, wherein the selector valve comprises a plurality of selector valves.

12. The fuel system of claim 1, wherein the selector valve is configured to be in a closed position with respect to the electric motor driven start pump when the electric motor driven start pump operates in a reverse direction.

13. A fuel system for an aircraft, the fuel system comprising:
    a main fuel pump configured to provide a fuel to an engine of the aircraft;
    a start pump configured to provide the fuel to an engine of the aircraft, the start pump being an electric motor driven start pump that is connected to a generator;
    a metering valve fluidly connected to the main fuel pump;
    a selector valve fluidly connected to the metering valve and the start pump and configured to receive the fuel pumped from the main fuel pump and the fuel pumped from the start pump; and
    a check valve between the metering valve and the start pump, wherein the check valve is configured to permit a bypass flow to flow from the metering valve to the start pump;
    wherein the start pump is configured to operate in a forward direction to deliver the fuel to the engine of the aircraft during engine start-up and is configured to operate in a reverse direction after engine start-up to generate electrical power.

14. The fuel system of claim 13, wherein the check valve is configured to be in a closed position when the start pump operates in the forward direction and is configured to be in an open position when the start pump operates in the reverse direction.

15. The fuel system of claim 14, wherein the start pump is configured to be driven in the reverse direction by the bypass flow after engine start-up to operate the generator to generate the electrical power and to deliver the bypass flow to the main fuel pump or to a fuel tank.

16. The fuel system of claim 13, wherein the selector valve is configured to be in an open position when the start pump operates in the forward direction and is configured to be in a closed position with respect to the start pump when the start pump operates in the reverse direction.

17. The fuel system of claim 13, wherein the main fuel pump is a positive displacement pump.

18. The fuel system of claim 13, further including:
    a main boost pump fluidly connected to a fuel tank; and
    a main fuel filter fluidly connected to the main boost pump and the main fuel pump.

19. The fuel system of claim 13, wherein the start pump is fluidly connected to the main fuel pump.

20. The fuel system of claim 13, wherein the start pump is fluidly connected to a fuel tank.

* * * * *